Feb. 5, 1935.  W. W. MOHR  1,990,197
BEARING MECHANISM FOR VALVE STEMS
Filed July 7, 1930

INVENTOR.
WALTER W. MOHR
BY Albert C. Bell
ATTORNEY.

UNITED STATES PATENT OFFICE 1,990,197

BEARING MECHANISM FOR VALVE STEMS

Walter W. Mohr, Chicago, Ill., assignor, by mesne assignments, to Crawford Valve & Manufacturing Company, East Chicago, Ind., a corporation of Indiana Application July 7, 1930, Serial No. 466,128

7 Claims. (Cl. 251—45)

My invention relates to an improved form of bearing mechanism for valve stems, for valves of large size, and particularly valves of large size employed in connection with fluid under high pressure. In connection with valves of the kind referred to, it has been found necessary to exert pressures of large amounts on the operating mechanism to tightly close the valves and to open them, for example by using long levers to exert large turning moments on the valve operating mechanism, or by the use of impactor mechanism to produce large turning forces by inertia on the valve operating mechanism.

With valve operating mechanism of the kind referred to, considerable difficulty has been experienced in the past in providing bearings for such mechanisms that would stand up under the large forces exerted upon the operating mechanism. On account of the operating devices being mounted usually on the end of the valve operating mechanism, the large operating forces exerted upon the operating mechanism frequently produce large couples laterally of the valve stems, which the bearings must withstand, and at the same time the bearings must withstand the large axial thrusts on the operating mechanism, required to tightly close the valves and to open the valves.

By my improved bearing construction, all of the difficulties described, are adequately taken care of, so that the valve operating mechanism may be easily operated, and used over long periods of time without appreciable wear.

By my invention, I provide the valve operating mechanism with ball-bearings which are spaced longitudinally of the operating mechanism to withstand the lateral couples referred to, these ball bearings being constructed to withstand both axial and radial thrusts however they may be exerted on the operating mechanism, and particularly to withstand the axial thrusts resulting from tightly closing and opening the valve, the ball-bearing provided to withstand the thrust of tightly closing the valve, being preferably larger than the ball-bearing provided to withstand the thrust of opening the valve.

In my co-pending application, Serial No. 466,129, I show and claim other mounting means for operating mechanism for valves of the kind referred to, the present application being restricted to the construction shown and described herein. Said co-pending application has become Patent Number 1,831,187 which issued November 10, 1931.

Figure 1:
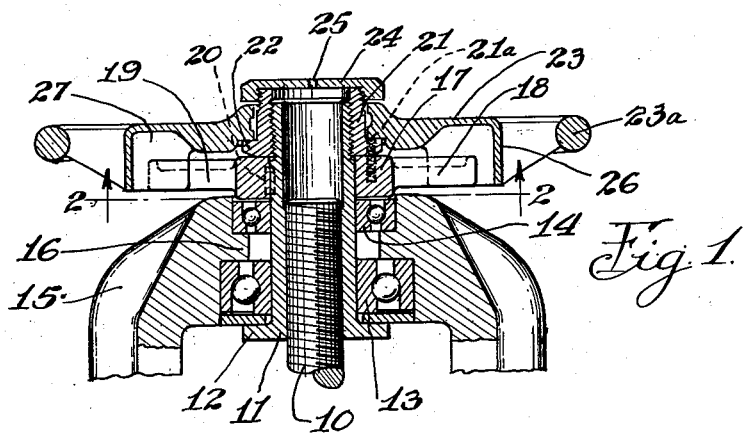
Figure 2:
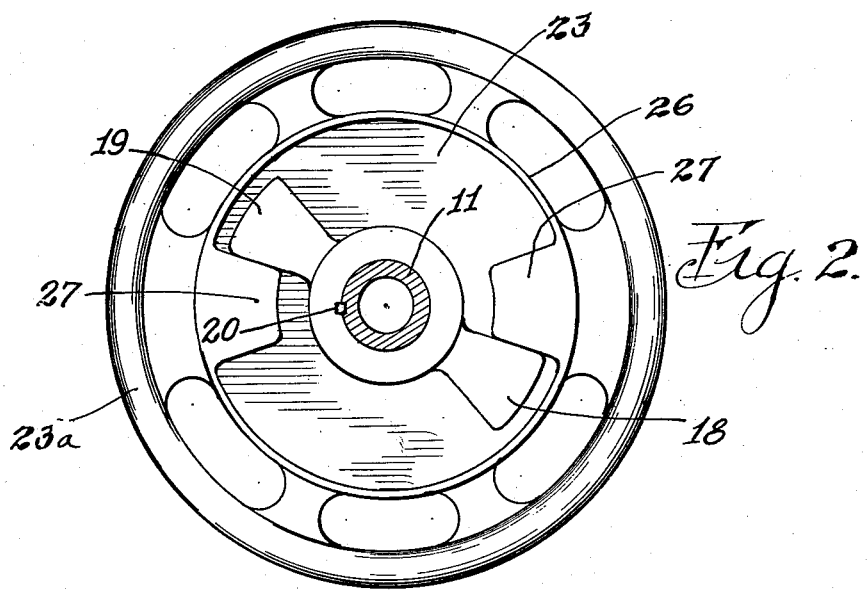

My invention will best be understood by reference to the accompanying drawing showing a preferred embodiment thereof, in which Fig. 1 is a vertical, central, sectional view of a valve operating mechanism provided with my improved bearing construction, and equipped with operating devices of the impactor type, and Fig. 2 is a sectional view of the parts shown in Fig. 1 taken along the line 2—2.

Similar numerals refer to similar parts throughout the several views.

As shown in the drawing, a threaded valve stem is illustrated at 10 which is of the type movable axially and incapable of rotary movement, to move the valve member to and from its closed position. The threaded stem 10 engages a longitudinally threaded sleeve 11 provided at its lower end with a flange 12. A first ball-bearing 13 is rigidly mounted on the lower part of the sleeve 11 and against the upper surface of the flange 12. The sleeve 11 also has rigidly mounted thereon a second ball-bearing 14 which is spaced axially from the ball-bearing 13 to withstand lateral couples that may be exerted upon the bearings by operation of the valve mechanism. The other members of the ball bearings 13 and 14, are provided with a stationary support, for example, in suitable recesses formed in the upper and lower portions of the upper end of a yoke 15, from which a flange 16 extends inwardly between said bearings to receive the thrust upwardly of the bearing 13 and the thrust downwardly of the bearing 14. The bearing 13 is of a type to withstand radial thrust and also to withstand axial thrust in a direction tending to move the inner member of the bearing upwardly, while the bearing 14 is of a type to withstand radial thrust and also to withstand axial thrust tending to move the inner member of said bearing downwardly.

Above the bearing 14, the sleeve 11 has rigidly secured thereto a hub 17 having oppositely extending arms 18 and 19. The hub 17 is preferably rigidly secured to the sleeve 11 in any suitable manner, for example, by a key 20, and the hub 17 may be nearly or quite in engagement with the inner member of the bearing 14. The sleeve 11 above the hub 17, is externally threaded, to engage internal threads in a short sleeve 21 provided with a lower flange 22 upon which the hub of a hand-wheel 23 rests, the hand-wheel having a free fit on the sleeve 21, so that it may move freely angularly on said sleeve 21. The outer end of the sleeve 21 is externally threaded to engage corresponding threads in a cap 24 which holds the hand-wheel 23 on the sleeve 21, and closes the upper ends of the sleeves 11 and 21. The cap 24 is preferably provided centrally with an oil hole 25 for lubricating the valve stem 10. The flange 22 is preferably secured to the hub 17 by a screw 21a to prevent turning movement of the sleeve 21 on the sleeve 11, and the sleeve 21 tends to prevent axial displacement of the hub 17 from its position on the sleeve 11 adjacent the bearing 14.

The hand-wheel 23 is preferably provided with an imperforate web extending nearly to the hand-ring 23a of the hand-wheel, and from the outer edge of the web, a flange member 26 extends axially to enclose the arms 18 and 19. The flange 26 is provided with inwardly projecting lugs 27, in the path of the ends of the arms 18 and 19, permitting limited angular movement of the hand-wheel on the sleeve 21. In this manner by quickly moving the hand-wheel from one of its extreme positions to the other, the inertia of the wheel may be communicated to the arms 18 and 19 and thus to the hub 17 and in turn to the sleeve 11, to exert a large amount of axial thrust on the valve stem 10 to open or close the valve as desired.

As a result of the construction described, it will be observed that the large amount of force exerted axially upon the valve stem 10 in fully closing the valve, is communicated to the bearing 13 in the axial direction it is constructed to withstand, and in turn to the flange 16 of the stationary support of the bearing. Similarly, the force required to open the valve, which may be considerable at the start, is exerted axially on the bearing 14 in the direction which it is constructed to withstand and which is communicated in turn by said bearing to the flange 16 of the stationary support of the bearing. It will also be observed that the spaced relation of the bearings axially, permits them to effectively withstand the bearing pressures resulting from lateral couples that may develop from the operation of the valve operating mechanism by the impactor devices associated with the operating devices.

While I have shown my invention in the particular embodiment above described, it will be understood that I do not limit myself to this exact construction as I may employ equivalents known to the art at the time of the filing of this application without departing from the scope of the appended claims.

What I claim is:

1. Bearing mechanism for valve stems for valves of the class provided with a threaded valve stem limited to longitudinal movement, a yoke for receiving the thrusts of operating said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of an internally threaded sleeve for engaging the threads on a stem of the class described and rigidly secured to an arm of the class described, and spaced ball-bearings co-axial with said sleeve and mounting said sleeve for rotary movement in a yoke of the class described and holding said sleeve against axial movement relatively to said yoke, said yoke having an annular flange between and engaging said ball-bearings to receive axial thrusts on said ball-bearings, each of said ball-bearings having ball races withstanding radial thrusts thereon and also axial thrusts directed towards said yoke flange.

2. Bearing mechanism for valve stems for valves of the class provided with a threaded valve stem limited to longitudinal movement, a yoke for receiving the thrusts of operating said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of a rotary threaded member rigidly secured to an arm of the class described, and spaced ball-bearings mounting said member for rotary movement in a yoke of the class described, said yoke having a flange extending between said ball-bearings to receive axial thrusts thereon, each of said ball-bearings having ball races withstanding radial thrusts thereon and also axial thrusts directed towards said flange.

3. Bearing mechanism for valve stems of valves of the class provided with a threaded valve stem, a fixed support for said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of a rotary threaded member rigidly secured to an arm of the class described, and spaced ball-bearings mounting said member for rotary movement relatively to said support, said support extending between said ball-bearings to receive axial thrusts communicated by said member to each of said ball-bearings in a direction towards said support extension.

4. Bearing mechanism for valve stems of valves of the class provided with a threaded valve stem, a fixed and integral support for said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of a rotary threaded member rigidly secured to an arm of the class described, a first ball-bearing for said member, a first seat in said support for said first ball-bearing restraining the latter and said member from lateral movement and from axial movement in a first direction, a second ball-bearing for said member, and a second seat in said support for said second ball-bearing restraining the latter and said member from lateral movement and from axial movement in a direction the reverse of said first direction.

5. Bearing mechanism for valve stems of valves of the class provided with a threaded valve stem, a fixed and integral support for said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of a rotary threaded member rigidly secured to an arm of the class described, a first ball-bearing for said member, a first seat in said support for said first ball-bearing restraining the latter and said member from lateral movement and from axial movement in a first direction, a second ball-bearing for said member, and a second seat in said support for said second ball-bearing restraining the latter and said member from lateral movement and from axial movement in a direction the reverse of said first direction, said ball-bearings being spaced to withstand couples exerted laterally on said member.

6. Bearing mechanism for valve stems of valves of the class provided with a threaded valve stem, a fixed and integral support for said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of a rotary threaded member rigidly secured to an arm of the class described, a first ball-bearing for said member, a first seat in said support for said first ball-bearing restraining the latter and said member from lateral movement and from axial movement in a first direction, a second ball-bearing for said member, and a second seat in said support for said second ball-bearing restraining the latter and said member from lateral movement and from axial movement in a direction the reverse of said first direction, one of said ball-bearings being larger than the other and receiving the axial thrusts of holding the valve stem in its position tightly closing the valve.

7. Bearing mechanism for valve stems for valves of the class provided with a threaded valve stem limited to longitudinal movement, a yoke for receiving the thrusts of operating said stem, and turning means for operating said stem comprising an arm rotatable about the axis of said stem and a hand wheel rotatable about the axis of said stem and having rotary movement limited to less than one rotation relatively to said arm and having a stop engaging said arm to impart stem operating impacts to said arm, characterized by the combination of an internally threaded first sleeve for engaging the threads on a stem of the class described and rigidly secured to an arm of the class described, spaced ball-bearings coaxial with said sleeve and mounting said sleeve for rotary movement in a yoke of the class described and holding said sleeve against axial movement relatively to said yoke, said yoke having an annular flange between and engaging said ball-bearings to receive axial thrusts on said ball-bearings, each of said ball-bearings having ball races withstanding radial thrusts thereon and also axial thrusts directed towards said yoke flange, and a second sleeve mounted on said first sleeve and constituting a support for a hand wheel of the class described.

WALTER W. MOHR.